Figure 1:
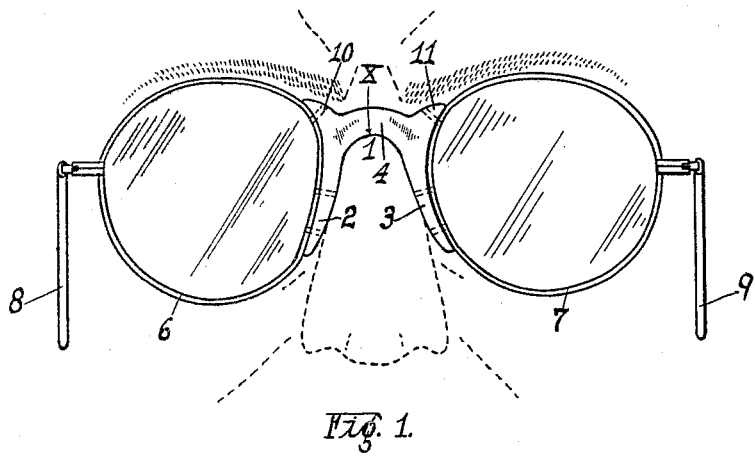

C. L. HOGUE.
EYEGLASS MOUNTING.
APPLICATION FILED FEB. 12, 1920.

1,385,828.

Patented July 26, 1921.

Inventor
Charles L. Hogue.

UNITED STATES PATENT OFFICE.

CHARLES L. HOGUE, OF OAKLAND, CALIFORNIA.

EYEGLASS-MOUNTING.

1,385,828.　　　　　Specification of Letters Patent.　　Patented July 26, 1921.

Application filed February 12, 1920. Serial No. 358,055.

*To all whom it may concern:*

Be it known that I, CHARLES L. HOGUE, a citizen of the United States, residing at Oakland, in the county of Alameda and State of California, have invented certain new and useful Improvements in Eyeglass-Mountings, of which the following is a specification.

The present invention is an eyeglass mounting, and relates more in particular to the bridge piece of spectacles.

The object of the invention is to provide a bridge piece which will be more comfortable to the wearer and which will remain in position with more certainty.

With the above objects in view, the bridge piece of the invention is provided with elongated nose rests to distribute the weight of the glasses over a large area of the bridge of the nose without any pinching or binding action; and has its upper edge provided with portions adapted to fit and rest against the eye-sockets at the upper sides of the nose to prevent the upward movement of the glasses while being worn.

The invention further resides in the sundry details of construction which will be hereinafter more fully described.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

Figure 2:
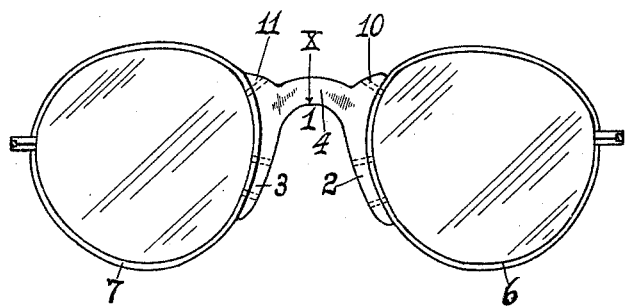

Referring to the drawings:

Figure 1 is a front view of a pair of spectacles equipped with the bridge piece according to the invention, and being shown in the position they assume when being worn, and Fig. 2 is a rear view of the spectacles equipped with the bridge piece of the invention.

Like numerals denote similar and like parts throughout the specification and drawings.

Referring in detail to the drawings: 1 indicates the bridge piece formed of a substantially flat oblong piece of material bifurcated or cut away longitudinally and upwardly from its lower edge to a point X adjacent its upper edge, thus forming elongated and opposing nose rests 2 and 3 and a transverse bridge bar 4. The walls of the bifurcation gradually converge upwardly to the point X where they round to an arc, immerging into the lower edge of the bridge bar 4. The bar 4 may have a smooth under surface slightly concaved or curved to conform to the natural curvature across the bridge of the nose. The outer side edges of the rests 2 and 3 are concaved in order to fit and receive the peripheries of the lens mountings 6 and 7, which are secured thereto by any suitable means. Of course, the glasses may be provided with ordinary templets 8 and 9.

The upper corners of the bridge 1 extend above the bar 4 to provide projections 10 and 11 having their upper surfaces rounded to fit under the eye sockets, as indicated in Fig. 1. The projections 10 and 11 thus prevent the glasses from rising upwardly out of the position shown in Fig. 1, while being worn. By reason of the nose rests 2 and 3 being elongated as indicated, the weight of the glasses is distributed over a comparatively large area on the nose, thus preventing soreness and cutting of the skin.

Eye-glasses equipped with the bridge according to this invention are particularly adapted for automobile goggles and the like against which the wind pressure is great, and in ordinary cases cause irritation of the skin and the glasses to be blown off.

Having thus described my invention, what I claim is:

1. A bridge for eyeglasses comprising spaced and elongated downwardly-extending nose rests connected by a transverse portion at their upper ends, the outer sides of each of said nose rests being adapted to be secured to lens mounts, and means on the bridge to engage under the eye socket of each eye to prevent an upward movement of the glasses.

2. A bridge for eyeglasses comprising an integral piece of material bifurcated upwardly from its lower edge to a point adjacent its upper edge to form elongated and spaced nose rests, the outer side edges of said nose rests being concaved and constructed to receive and fit lens mountings.

3. A bridge for eyeglasses comprising an integral piece of material bifurcated upwardly from its lower edge to a point adjacent its upper edge to form elongated and spaced nose rests, the outer side edges of said nose rests being concaved and constructed to receive and fit lens mountings, the upper corners of said bridge being formed with upwardly extending projections to fit under the eye socket of each eye for the purposes set forth.

In testimony whereof I affix my signature.

CHARLES L. HOGUE.